(12) United States Patent
Farmanyan et al.

(10) Patent No.: US 9,116,030 B2
(45) Date of Patent: Aug. 25, 2015

(54) LIQUID LEVEL TRANSDUCER WITH ISOLATED SENSORS

(75) Inventors: Gagik Farmanyan, Plano, TX (US); Jorge Manuel Prieto, Garland, TX (US)

(73) Assignee: Texas LFP, LLC, Dallas, TX (US)

( * ) Notice: Subject to any disclaimer, the term of this patent is extended or adjusted under 35 U.S.C. 154(b) by 479 days.

(21) Appl. No.: 13/352,320

(22) Filed: Jan. 17, 2012

(65) Prior Publication Data
US 2013/0180329 A1    Jul. 18, 2013

(51) Int. Cl.
*G01F 23/38* (2006.01)
*H01H 36/02* (2006.01)
*H01H 36/00* (2006.01)

(52) U.S. Cl.
CPC ........... *G01F 23/38* (2013.01); *H01H 36/0013* (2013.01); *H01H 36/0033* (2013.01); *H01H 36/02* (2013.01)

(58) Field of Classification Search
CPC ................................ H01H 36/02; G01F 23/38
USPC ........................................................... 73/317
See application file for complete search history.

(56) References Cited

U.S. PATENT DOCUMENTS

| | | |
|---|---|---|
| 3,470,907 A | 10/1969 | Shockey |
| 4,641,122 A | 2/1987 | Hennequin |
| 4,972,875 A | 11/1990 | Beer et al. |
| RE34,679 E | 8/1994 | Ritzenthaler et al. |
| 5,762,049 A | 6/1998 | Jones et al. |
| D419,091 S | 1/2000 | Pattison et al. |
| 6,089,086 A * | 7/2000 | Swindler et al. ................. 73/317 |
| 6,401,533 B1 * | 6/2002 | Gier et al. ........................ 73/313 |
| D557,157 S | 12/2007 | Sitnikov |
| 7,322,234 B2 * | 1/2008 | Vargas Da Silva ............. 73/313 |
| D611,859 S | 3/2010 | Gismervik |
| D611,860 S | 3/2010 | Gismervik |
| 2006/0016256 A1* | 1/2006 | Bauerle et al. .................. 73/313 |

FOREIGN PATENT DOCUMENTS

DE        19752770 A1 *   6/1999

\* cited by examiner

*Primary Examiner* — Paul West
(74) *Attorney, Agent, or Firm* — Alvin R. Wirthlin (57) ABSTRACT

A transducer for determining the level of liquid within a container includes a mounting head adapted for connection to the container and a sensor assembly adapted to extend into the container. A housing of the sensor assembly has a hollow interior that is isolated from liquid within the container. A plurality of sensor elements are located within the interior. A float rod is pivotally connected to the housing and a float is connected to a distal end of the float rod. An actuator located outside the housing is operatively associated with the float rod for pivotal movement therewith. The actuator is operative to change an electrical state of at least one of the sensor elements to thereby indicate a level condition of the liquid within the container. A snap-fit assembly of the mounting head and sensor assembly is also disclosed.

20 Claims, 10 Drawing Sheets

FIG. 14 and including an enlarged portion showing the details of a snap-fit assembly.

LIQUID LEVEL TRANSDUCER WITH ISOLATED SENSORS

BACKGROUND OF THE INVENTION

This invention relates to liquid level transducers, and more particularly to a liquid level transducer having a float that moves in response to a change in liquid level and a method of constructing the liquid level transducer.

Transducers for measuring liquid level are often used in vehicles, industrial equipment, as well as other mobile and stationary systems and components. The electrical output of such transducers varies in response to a change in the liquid level being measured and is typically in the form of a change in resistance, capacitance, current flow, magnetic field, and frequency. These types of transducers may include variable capacitors or resistors, optical components, Hall Effect sensors, strain gauges, ultrasonic devices, reed switch arrays, and so on.

For reed switch-type devices, a plurality of reed switches are usually arranged in series with a plurality of resistors along the length of a circuit board. The reed switches are normally responsive to the presence and absence of a magnetic field for opening and/or closing the switch. A float rides along the surface of the liquid to be measured and is constrained to move in a linear direction along the circuit board. The float usually includes an embedded magnet to trip one of the reed switches as the float moves in response to a change in liquid level in the tank. Thus, the resistance of the circuit, which is indicative of liquid level, depends on the position of the float and the particular reed switch that has been tripped.

However, such devices typically have several drawbacks. For example, it is known that reed switches suffer from hysteresis effects and may open and/or close prematurely depending on the orientation of the reed switches with respect to the magnet, the magnetic strength of the magnet, the distance between the reed switch and the magnet, and so on. When the reed switches are aligned linearly, each reed switch may open and close up to three times as the float approaches, aligns with, and passes each reed switch, thus leading to improper liquid level indication, undesired switching, and premature failure of the switches. In addition, prior art solutions expose the reed switches to the liquid being measured, which may be corrosive and cause inaccurate liquid level readings and premature failure. It would therefore be desirable to overcome at least some of the disadvantages associated with prior art reed switch-type liquid level transducers.

In addition, prior art liquid level transducers that include a mounting head and an elongate sensor probe, such as a reed switch probe, resistor probe, capacitor probe, and so on, are often difficult and time-consuming to assemble due to the number of individual components and the fastening means associated with each component. It would therefore be desirable to provide a liquid level transducer that is easier to assemble and has relatively fewer parts.

SUMMARY OF THE INVENTION

In accordance with one aspect of the invention, a transducer for determining the level of liquid within a container includes a mounting head adapted for connection to the container and a sensor assembly adapted to extend into the container from the mounting head. The sensor assembly includes a housing having an upper portion connected to the mounting head and a lower portion that extends from the upper portion. The lower portion has a hollow interior that is isolated from liquid within the container. A plurality of sensor elements are located within the housing. A float rod is pivotally connected to the housing and a float is connected to a distal end of the float rod to thereby cause pivoting movement of the float rod in response to a change in liquid level within the container. An actuator is located outside of the housing and is operatively associated with the float rod for pivotal movement therewith. The actuator is operative to change an electrical state of at least one of the sensor elements to thereby indicate a level condition of the liquid within the container.

In accordance with a further aspect of the invention, a transducer for determining the level of liquid within a container includes a housing adapted to extend into the container, the housing having a hollow interior that is isolated from liquid within the container. A plurality of sensor elements are located within the housing and a float rod is pivotally connected to the housing. A float is connected to a distal end of the float rod to thereby cause pivoting movement of the float rod in response to a change in liquid level within the container. An actuator is located outside of the housing and is operatively associated with the float rod for pivotal movement therewith. The actuator is operative to change an electrical state of at least one of the sensor elements to thereby indicate a level condition of the liquid within the container.

In accordance with yet another aspect of the invention, a transducer for determining the level of liquid within a container includes a sensor assembly adapted to extend into the container and a mounting head connected to the sensor assembly. The sensor assembly has a first housing with a first wall defining a first hollow interior, at least one sensor located within the hollow interior space, and a plurality of tabs extending upwardly from the wall and spaced around a circumference thereof. The mounting head includes a second housing with a second wall defining a second hollow interior for receiving the first housing and a plurality of connecting members associated with the second wall and corresponding to the plurality of tabs. The tabs and connecting members are mutually engageable in a snap-fit arrangement to thereby connect the sensor assembly to the mounting head.

BRIEF DESCRIPTION OF THE DRAWINGS

The following detailed description of the preferred embodiments of the present invention will be best understood when considered in conjunction with the accompanying drawings, wherein like designations denote like elements throughout the drawings, and wherein.

It is noted that the drawings are intended to depict only exemplary embodiments of the invention and therefore should not be considered as limiting the scope thereof. It is further noted that the drawings are not necessarily to scale. The invention will now be described in greater detail with reference to the accompanying drawings.

DETAILED DESCRIPTION OF THE INVENTION

Referring now to the drawings, and to FIGS. 1-8 in particular, a liquid level transducer 10 in accordance with an exemplary embodiment of the present invention is illustrated. The liquid level transducer 10 preferably extends into a container 12 (shown in FIG. 3), such as a fuel tank, oil reservoir, radiator, brake fluid chamber, or any other container for holding and/or transporting a liquid (not shown) where it is desirous to determine the level of liquid within the container. The transducer 10 preferably includes a mounting head 14 for connection to the container 12 and a sensor assembly 16 installed in the mounting head 14 and extending downwardly therefrom.

Figure 1:
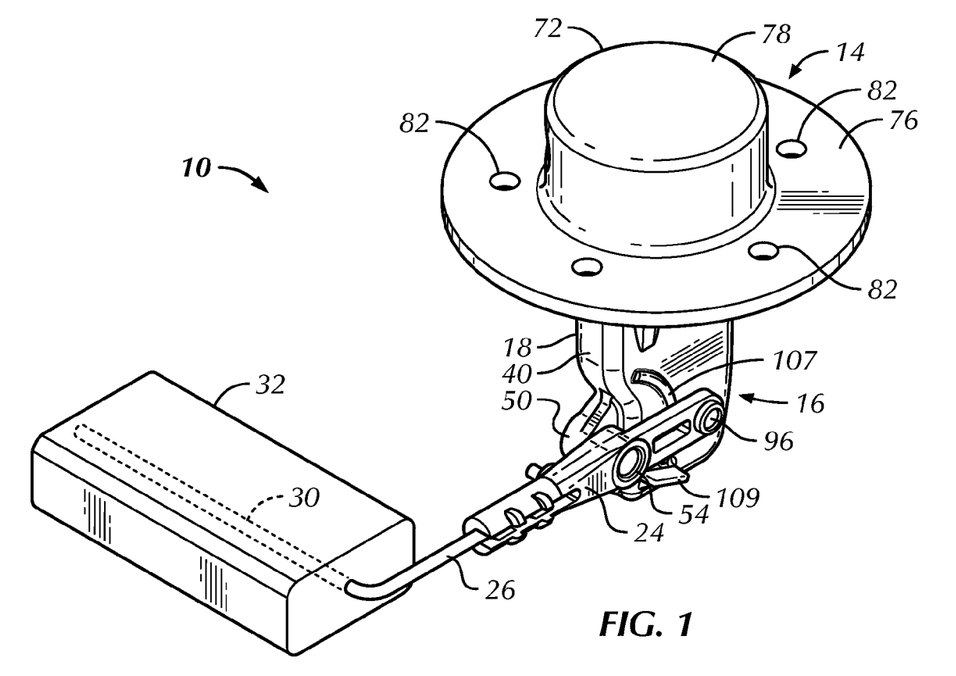
FIG. 1 is a right side top isometric view of a liquid level transducer in accordance with the present invention with the float shown in broken line to illustrate the float rod.
Figure 2:
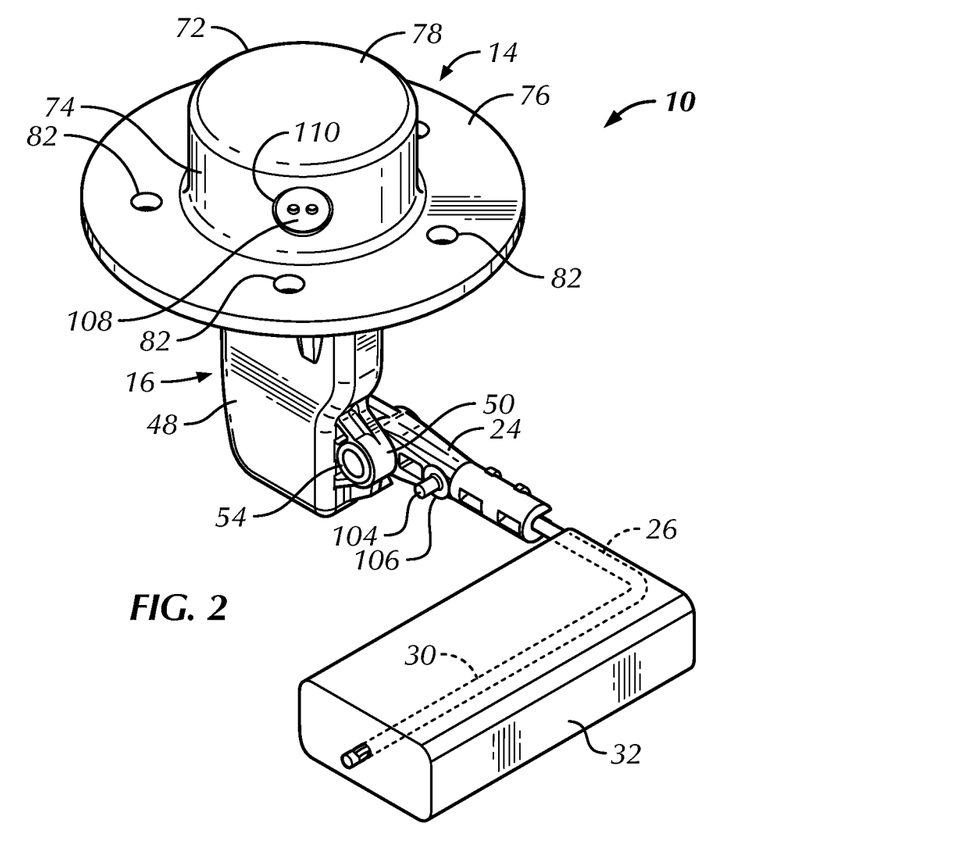
FIG. 2 is a left side top isometric view thereof.
Figure 3:
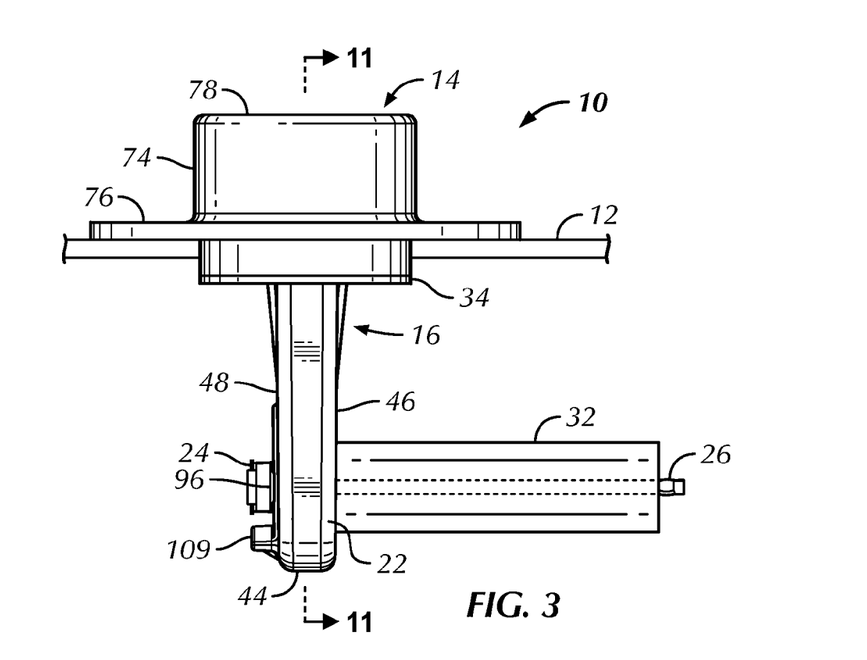
FIG. 3 is a rear elevational view of the liquid level transducer installed in a container.
Figure 4:
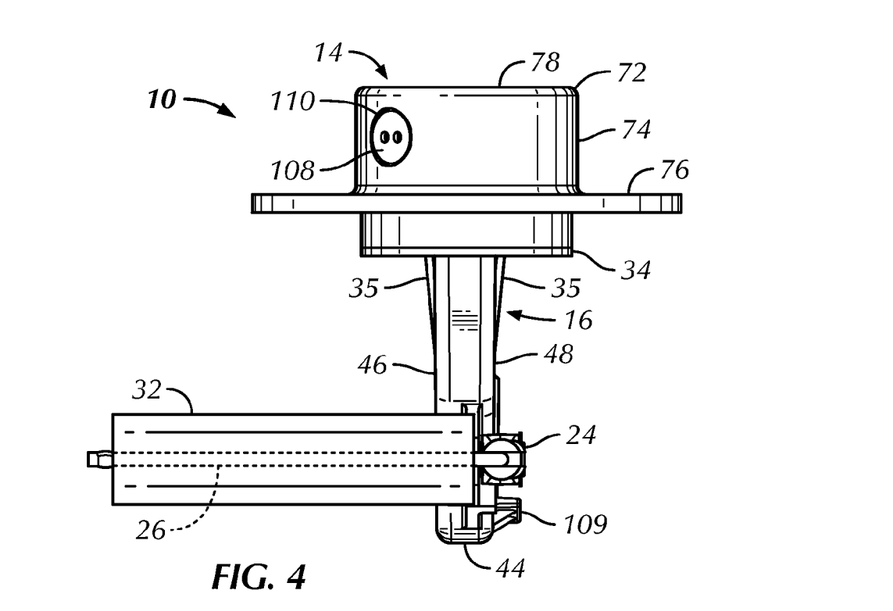
FIG. 4 is a front elevational view thereof.
Figure 5:
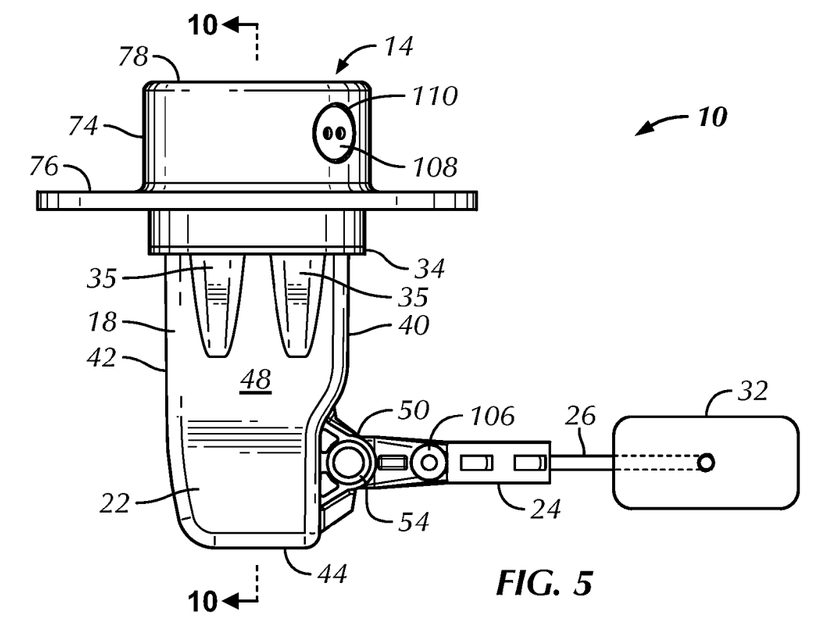
FIG. 5 is a right side elevational view thereof.
Figure 6:
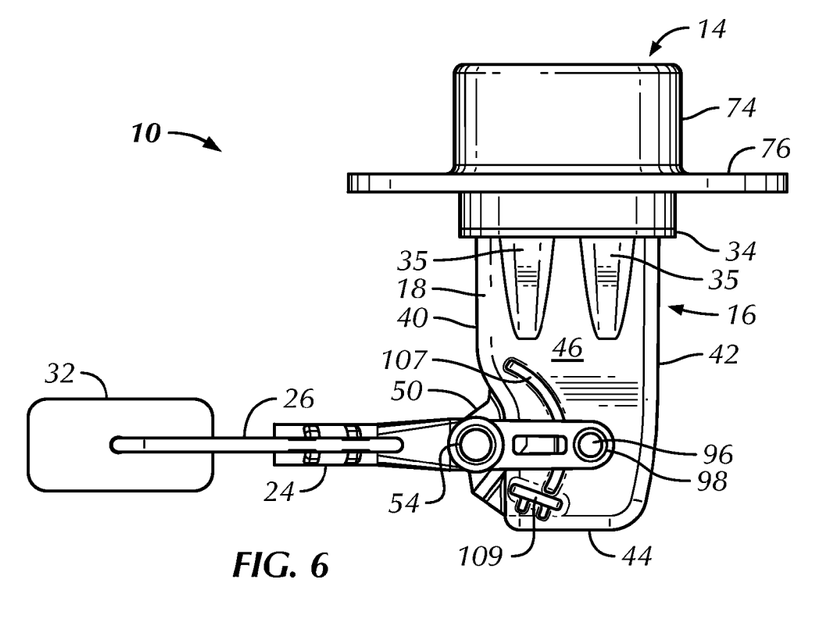
FIG. 6 is a left side elevational view thereof.
Figure 7:
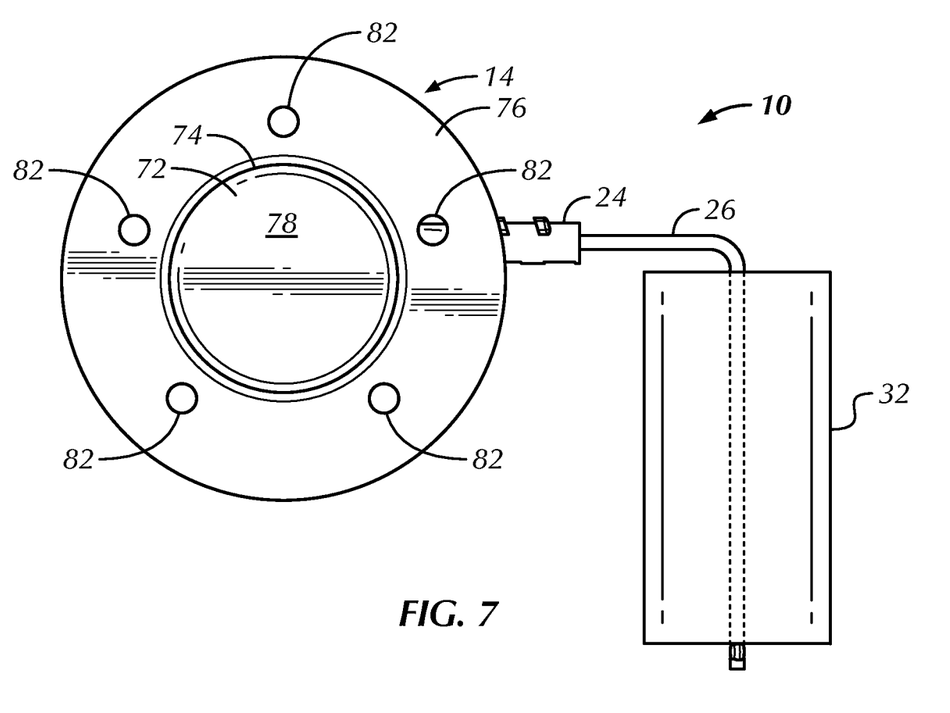
FIG. 7 is a top plan view thereof.
Figure 8:
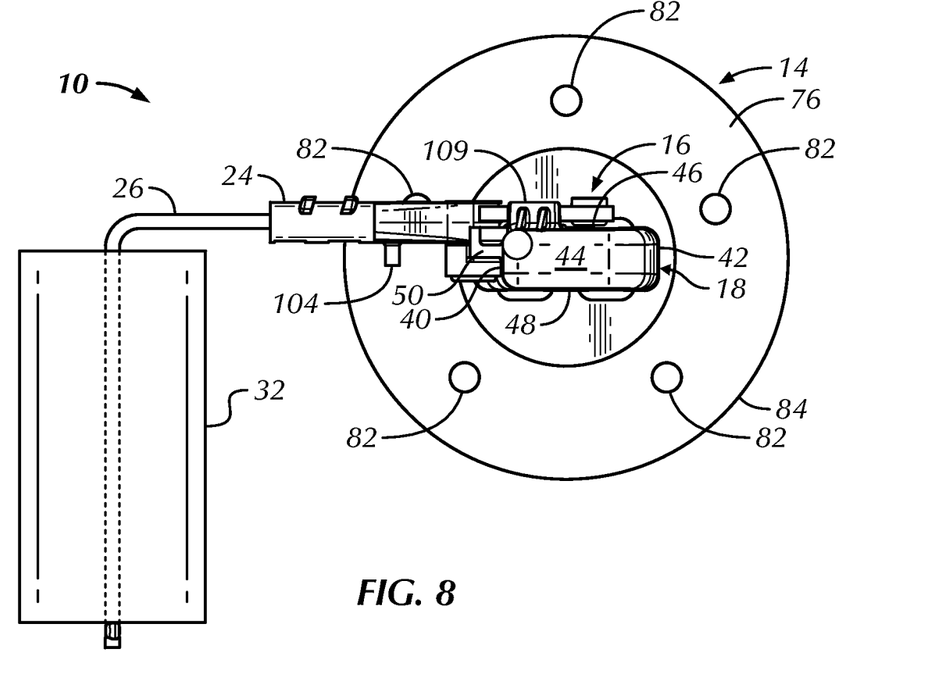
FIG. 8 is a bottom plan view thereof.
Figure 9:
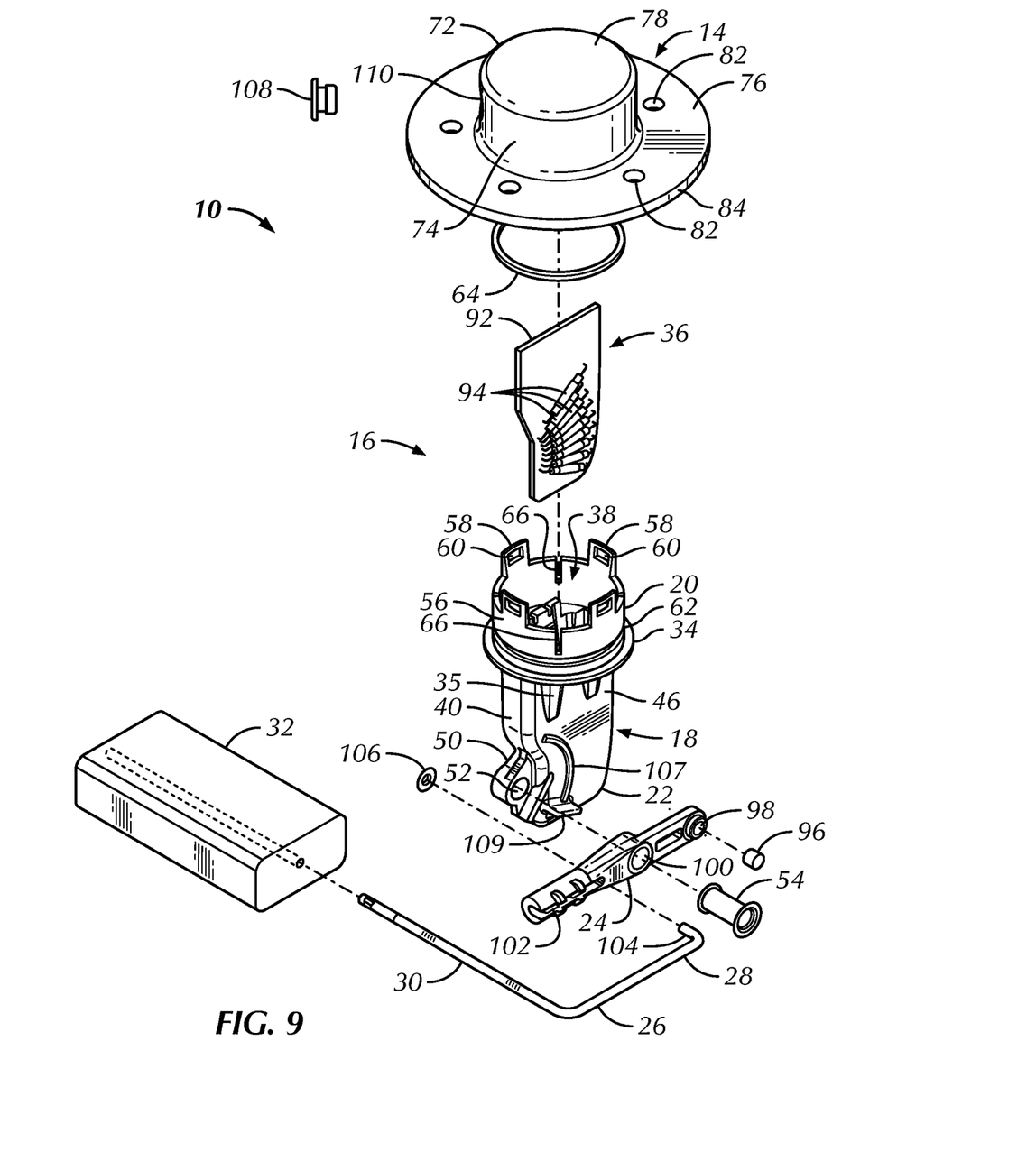
FIG. 9 is a right side top isometric exploded view of the liquid level transducer.
Figure 10:
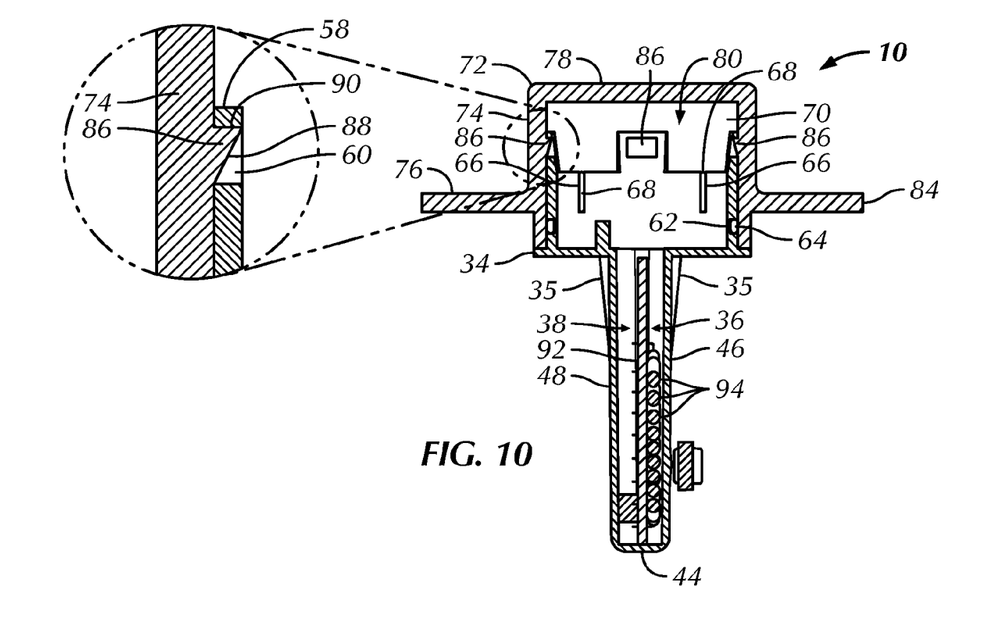
FIG. 10 is a longitudinal sectional view of the liquid level transducer taken along line 10-10 of FIG. 5 and including an enlarged portion showing the details of a snap-fit assembly.
Figure 11:
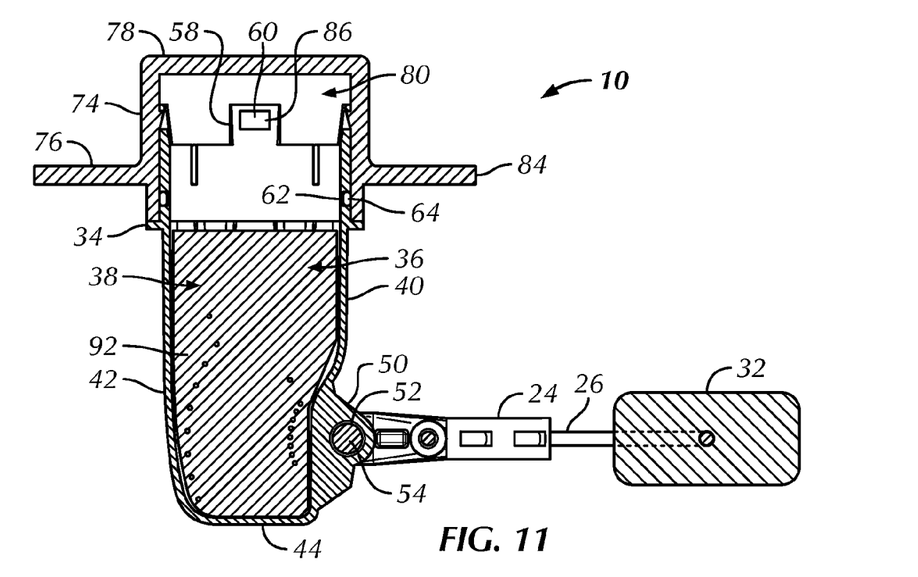
FIG. 11 is a longitudinal sectional view of the liquid level transducer taken along line 11-11 of FIG. 3.

With additional reference to FIGS. 9-11, the sensor assembly 16 preferably senses liquid level in an arcuate direction as the liquid rises and falls within the container and, in accordance with one preferred embodiment of the invention, includes a housing 18 with an upper housing section 20 that extends into the mounting head 14 and a lower housing section 22 that extends downwardly from the upper section. A rod support 24 is pivotally connected to the lower section 22. A float rod 26 has a proximal end 28 connected to the float rod support 24 and a distal end 30 that receives a float 32. As shown, the float rod 26 can be bent to accommodate the float rod mounting and the configuration of a particular tank or container. However, it will be understood that the float rod can be straight or configured in any desired shape to accommodate different liquid level measurement conditions.

The housing 18 preferably includes a circular flange 34 located between the upper section 20 and lower section 22. The circular flange 34 preferably abuts or is closely adjacent to a lower end of the mounting head 14 when assembled. Reinforcing ribs 35 are preferably formed on the housing 18. As shown, the upper housing section 20 is preferably circular in cross-section to receive the mounting head 14 while the lower housing section 22 is preferably rectangular in cross-section to receive a sensor unit 36. The housing 18 is preferably constructed of a molded material, such as plastic, through injection molding and/or blow molding techniques to form a hollow interior or pocket 38 into which the sensor unit 36 is received. Due to its unitary construction, the hollow interior 38 and its contents are completely isolated from the liquid being measured to advantageously increase the measurement reliability of the transducer 10 and extend its useful life over prior art arrangements where measurement components are directly exposed to the liquid being measured. Since many liquids are corrosive in nature and could cause deterioration of the measurement components and their electrical connections in prior art solutions, isolation of the sensor unit 36 in accordance with the present invention prevents deterioration of both the measurement components as well as their electrical connections, thereby providing a liquid level transducer 10 that is more robust, reliable, and longer lasting than prior art solutions.

Although it is preferred to construct the housing 18 in the above-described manner, it will be understood that the housing can be formed of two or more pieces and connected together through well-known connecting means such as bonding, welding, and so on, as long as the hollow interior and its contents are isolated from the liquid being measured. It will be further understood that the housing is not limited to plastic material but may be constructed of metal, composites, ceramics, combinations thereof; or any other suitable non-magnetic material. Moreover, although the upper section 20 and lower section 22 of the housing 18 are respectively circular and rectangular in cross section, it will be understood that the housing 18 and its sections can be of any suitable shape without departing from the spirit and scope of the invention.

The lower section 22 of the housing 18 preferably includes a front wall 40, a rear wall 42, a bottom wall 44 extending between the front and rear walls, and side walls 46 and 48 extending laterally between the front and rear walls and upwardly from the bottom wall to the circular flange 34. A pivot mount 50 is preferably integrally formed with the housing 18 and extends forwardly from the front wall 40. An opening 52 extends through the pivot mount 50 for receiving a pivot connector 54. As shown most clearly in FIG. 11, the pivot mount 50 is preferably solid in cross section and the opening 52 extends through the pivot mount 50 at a location that is spaced from the hollow interior 38. In this manner, the pivot mount 50 is isolated from the hollow interior to prevent the ingress of liquid therein from the container. In addition, the solid nature of the pivot mount makes it very robust to withstand forces due to the pivoting movement of the float as well as liquid sloshing within the container and other forces related to operation of the transducer 10 when installed in a vehicle, such as acceleration and deceleration forces. Although it is preferred that the pivot mount 50 be spaced from the hollow interior 38, it will be understood that the pivot mount can be coincident with the hollow interior as long as the housing and pivot mount are constructed to prevent the ingress of liquid into the hollow interior.

The upper housing section 20 preferably includes a circular wall 56 that extends upwardly from the circular flange 34. A plurality of connecting members or tabs 58 extend upwardly from the wall 56 and are preferably equally circumferentially spaced around the wall 56. An aperture 60 extends through each connecting tab 58 and is preferably rectangular in shape. However, it will be understood that the apertures 60 can be of any suitable shape. The tabs 58 are constructed in dimension and material to be somewhat flexible or resilient to receive the mounting head 14 in a snap-fit locking engagement. An annular groove 62 is preferably formed in the outer surface of the wall 56 for receiving an O-ring 64 or the like to seal the housing 18 to the mounting head 14, as best shown in FIGS. 10 and 11. In this manner, a seal is created to prevent the ingress of fluid into the housing 18 and mounting head 14 from the tank or other container. One or more alignment slots 66 can be formed in the circular wall 56 for receiving one or more complementary-shaped alignment protrusions 68 (FIGS. 10 and 11) formed on the inner surface 70 of the mounting head 14 to thereby properly align the mounting head 14 with respect to the housing 18 during assembly.

The mounting head 14 preferably includes a housing 72 with a circular side wall 74, a mounting flange 76 extending around the side wall 74, and an upper wall 78 terminating the upper end of the circular side wall 74 to form a hollow interior 80. The mounting head 14 is preferably formed as a unitary structure through injection molding, but may alternatively be formed by machining, die-casting, or other known forming means. The mounting flange 76 is preferably disk-shaped and includes a plurality of mounting holes 82 that extend axially through the mounting flange 76 and in proximity to its outer peripheral edge 84. The mounting holes 80 are adapted to receive threaded studs (not shown) associated with a tank or other container in a well-known manner. A plurality of connecting members 86 extend generally radially inwardly from the inner surface 70 of the side wall 74. Each connecting member preferably includes a lower ramped surface 88 that extends upwardly and inwardly from the inner surface 70 and an upper stepped surface 90 that extends between the ramped surface 88 and the inner surface 70.

During assembly, the alignment slots 66 of the wall 56 are aligned with the alignment protrusions 68 of the side wall 74. The mounting head 14 and housing 18 are then pressed together, causing the connecting tabs 58 to slide and flex inwardly along the ramped surface 88 until the apertures 60 clear the connecting members and the tabs 58 snap outwardly onto the upper stepped surface to thereby connect the mounting head 14 to the sensor assembly 16. Although four connecting tabs and cooperating connecting members are shown, it will be understood that more or less tabs and/or cooperating members can be provided without departing from the spirit and scope of the invention. With this arrangement, and the provision of the O-ring 64, the hollow interiors of both the mounting head 14 and housing 18 are sealed together and advantageously isolated from the outside environment.

As best shown in FIGS. 9-11, the sensor unit 36 preferably includes a sensor board 92, preferably in the form of a printed circuit board (PCB), located in the hollow interior or pocket 38 of the lower housing section 22. The PCB preferably extends along a substantial height and width of the interior pocket 38. A plurality of sensor elements 94, preferably in the form of normally-open reed switches 94, are mounted on the PCB 92 and can be connected in series with a plurality of resistors (not shown). The reed switches 94 are preferably oriented in an arcuate pattern, the radial center of which is coaxial with the aperture 52 in the pivot mount 50 of the housing 18. An actuator 96, preferably in the form of magnet, is located in an aperture 98 of the rod support 24 for pivoting movement therewith along an arcuate pathway coincident with the arcuate pattern of the reed switches 94. The pivot connector 54 is preferably in the form of a grommet, rivet, or other circular bearing member and extends through a pivot opening 100 in the rod support 24 and through the aperture 52 in the pivot mount 50 for pivotally connecting the rod support 24 to the housing 18. The rod support 24 preferably rotates about the pivot connector 54. Alternatively, the rod support 24 can be fixed with respect to the pivot connector and the pivot connector can rotate with respect to the pivot mount 50. The proximal end 28 of the float rod 26 is preferably received in an elongate groove 102 formed in the rod support 24 in a snap-fit engagement. An end 104 of the float rod 26 extends through the rod support 24 and receives a locking washer or cap 106 to fix the float rod to the rod support. Although a separate float rod and rod support are shown and described, it will be understood that they can be integrally formed as a unitary component without departing from the spirit and scope of the invention.

The reed switches 94 are responsive to the magnetic field generated by the magnet 96 which passes through the side wall 46 of the housing 48 as the magnet travels the arcuate pathway in response to float movement due to a change in the level of liquid within the container. When a magnetic field is present on one of the reed switches 94, the reed switch closes and creates a liquid level signal. As the magnet travels away from the reed switch, it will return to its normally open position and another reed switch will close under the magnetic field. In this manner, liquid level sensing can advantageously occur without exposing the reed switches to the liquid being measured to thereby advantageously increase the measurement reliability of the transducer 10 and extend its useful life over prior art arrangements. An arcuate projection 107 preferably extends outwardly from the side wall 46 to ensure that the magnet 96 and portion of the rod support 24 surrounding the magnet remain at a fixed spaced from the side wall 46 under bending forces or other forces that might be exerted during use, such as acceleration forces, liquid sloshing, and so on. A stop 109 also preferably projects outwardly from the side wall 46 for engaging the rod support 24 to limit movement of the float 32 under full tank and empty tank conditions.

It will be understood that normally closed reed switches can be used without departing from the spirit and scope of the invention. Although not shown, insulating material, such as potting material, and so on, can be located in the pocket 38, surrounding the PCB, reed switches, and other components to insulate and protect the components against shock, vibration, and other harsh conditions to which the transducer 10 may be exposed.

Although a particular number of reed switches are shown, it will be understood that more or less reed switches can be provided without departing from the spirit and scope of the invention. Electrical wires (not shown) preferably extend from the sensor board 92 and through a strain relief or grommet 108 located in an opening 110 of the side wall 74 of the mounting head 14. Alternatively, the grommet 108 can be in the form of an electrical connector or plug for receiving a complementary connector or plug associated with further processing and/or display circuitry (not shown) of the vehicle or other device with which the container is associated.

Figure 12:
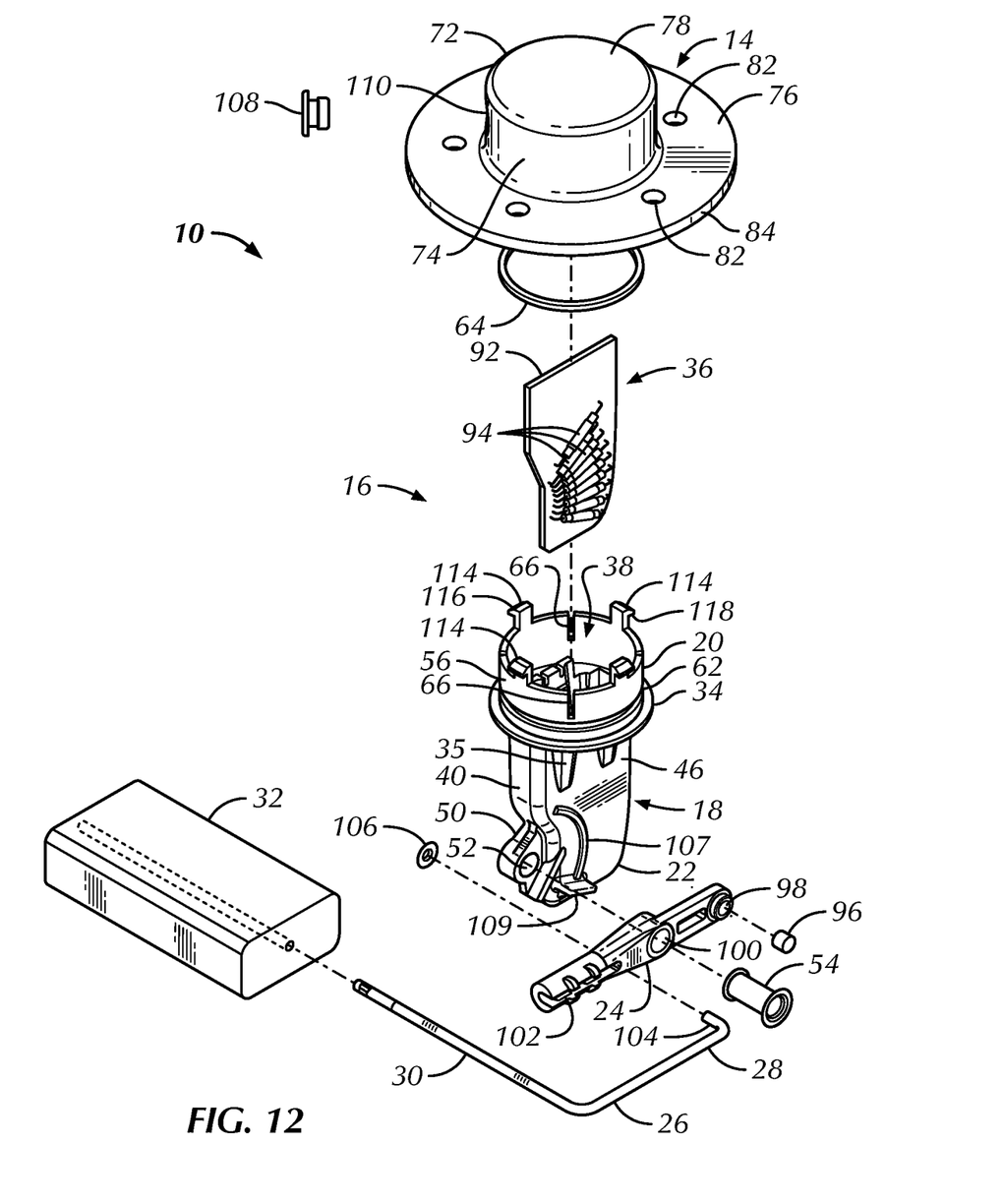
FIG. 12 is a right side top isometric exploded view of a liquid level transducer in accordance with a further embodiment of the invention.
Figure 13:
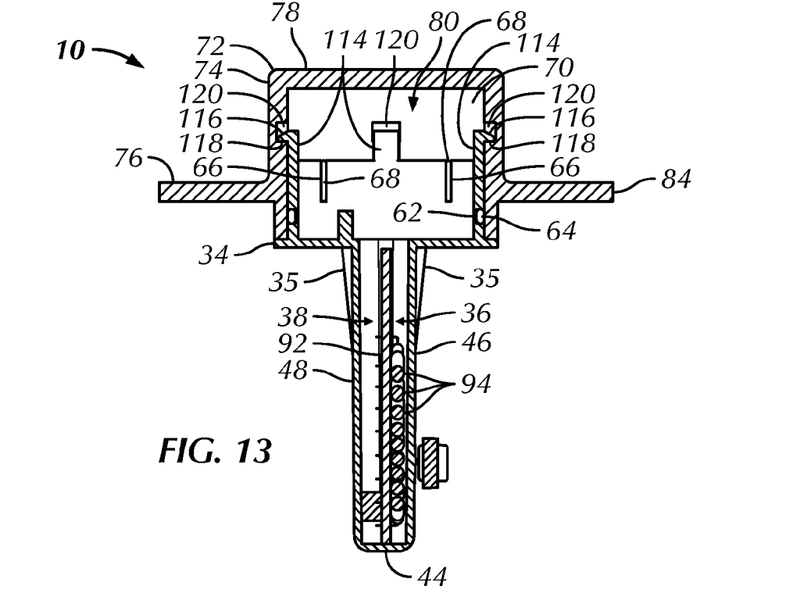
FIG. 13 is a longitudinal sectional view similar to FIG. 10 of the liquid level transducer of FIG. 12.
Figure 14:
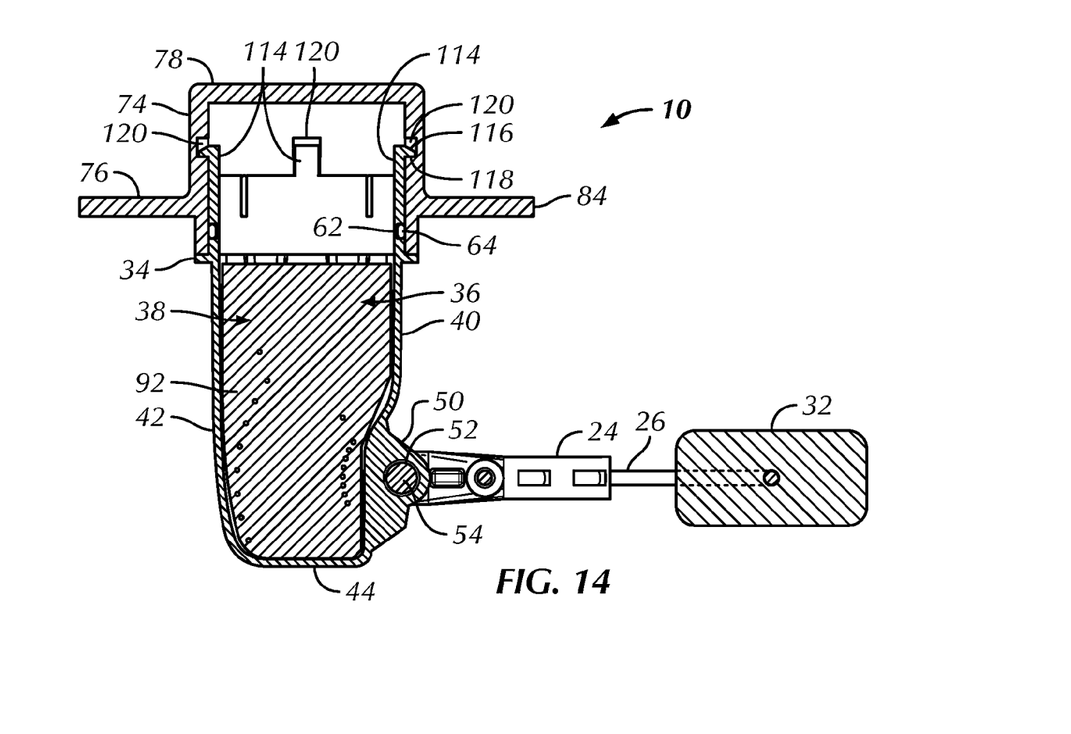
FIG. 14 is a longitudinal sectional view similar to FIG. 11 of the liquid level transducer of FIG. 12.

Referring now to FIGS. 12-14, a liquid level transducer 112 in accordance with a further embodiment of the invention is illustrated. The liquid level transducer 112 is somewhat similar in construction to the liquid level transducer 10 previously described, with the exception of the manner in which the mounting head 14 is snap-fit onto the housing 18. As shown, a plurality of hook-shaped connecting members or tabs 114 extend upwardly from the wall 56 of the housing 18 and are preferably equally circumferentially spaced around the wall 56. Each tab includes a ramped surface 116 and a lower stepped surface 118 that snap-fits into an inner groove or depression 120 formed in the inner surface 70 of the mounting head 14. It will be understood that the inner depression 120 can be continuous but can alternatively be discrete depressions coincident with the connecting tabs 114 on the housing 118. As in the previous embodiment, the tabs 114 are constructed in dimension and material to be somewhat flexible or resilient to receive the mounting head 14 in a snap-fit locking engagement.

During assembly, the alignment slots 66 of the wall 56 are aligned with the alignment protrusions 68 of the side wall 74 and the mounting head 14 and housing 18 are pressed together, causing the connecting tabs 114 to slide and flex inwardly along the ramped surface 116 until the lower stepped surfaces 118 clear the inner groove 120 whereupon the tabs 114 snap outwardly into groove 120 to thereby connect the mounting head 14 to the sensor assembly 16. Although four connecting tabs and cooperating connecting members are shown, it will be understood that more or less tabs and/or cooperating members can be provided without departing from the spirit and scope of the invention.

With regards to the snap-fit arrangement of the mounting head and sensor assembly of the preferred embodiments of the invention, although a reed switch-type sensor unit 36 has been shown and described, it will be understood that the present invention is not limited thereto. Other non-linear and linear-type liquid level measurement sensors can be used, including but not limited to, capacitance, heated wire, ultrasonic, optical, resistance cards for pivoting float arms, and so on.

It will be understood that the term "preferably" as used throughout the specification refers to one or more exemplary embodiments of the invention and therefore is not to be interpreted in any limiting sense. It will be further understood that the term "connect" and its derivatives refers to two or more parts capable of being attached together either directly or indirectly through one or more intermediate members. In addition, terms of orientation and/or position as may be used throughout the specification denote relative, rather than absolute orientations and/or positions.

It will be appreciated by those skilled in the art that changes could be made to the embodiments described above without departing from the broad inventive concept thereof. By way of example, the mounting head 14 is not limited to the flange-type arrangement as shown and described but can be formed with threads or other known mounting means for connecting the transducer to the container without departing from the spirit and scope of the invention. In addition, the sensor elements can be in the form of hall-effect sensors, optical sensors, or the like where direct contact is not required to change an electrical state of the sensor elements. Likewise, the actuator can be in the form of one or more magnets, LED's, optical fibers or other light source, or other contactless actuator/sensor arrangements to remotely change the electrical state of the sensor elements. In the event that optical sensors are used, the housing can be formed of a material that is translucent or transparent to the wavelength of the light source so that the sensor elements can readily detect movement of the light source as the liquid level in the container rises and falls. It will be understood, therefore, that this invention is not limited to the particular embodiments disclosed, but is intended to cover modifications within the spirit and scope of the present invention as defined by the appended claims.

What is claimed is:

1. A transducer for determining the level of liquid within a container, the transducer comprising:
    a mounting head adapted for connection to the container, the mounting head having a first housing with first wall structure defining a first hollow interior;
    a second housing having second wall structure defining a second hollow interior in fluid communication with the first hollow interior of the first housing, wherein at least the second hollow interior is isolated from liquid within the container;
    a sensor assembly adapted to extend into the container, the sensor assembly comprising:
        a sensor board located within the second hollow interior;
        at least one sensor element located on the sensor board within the second hollow interior;
        a pivot mount operably associated with the housing and defining a pivot axis spaced from the second hollow interior;
        a float rod connected to the pivot mount of the housing for pivotal movement about the pivot axis;
        a float connected to the float rod to thereby cause pivoting movement of the float rod about the pivot axis in response to a change in liquid level within the container; and
        an actuator located outside of the housing and connected to the float rod for pivotal movement therewith, the actuator being operative to change an electrical state of the at least one sensor element to thereby indicate a level condition of the liquid within the container.

2. A transducer according to claim 1, wherein the at least one sensor element comprises a plurality of reed switches and the actuator comprises a magnet that changes one of an open and closed electrical state of the reed switches during pivoting movement of the float rod.

3. A transducer according to claim 2, wherein the reed switches are mounted on the sensor board in an arcuate pattern.

4. A transducer according to claim 3, wherein a radial center of the arcuate pattern is coincident with the pivot axis of the pivot mount such that the magnet moves along the arcuate pathway in alignment with the arcuate pattern.

5. A transducer according to claim 1, wherein the pivot mount is located on the second housing and spaced from the second wall structure and thus the second hollow interior so that the second hollow interior is unbreached by the pivot mount to thereby maintain the integrity of the second hollow interior.

6. A transducer according to claim 5, wherein the first housing includes a first connecting portion formed in the first hollow interior and the second housing includes a second connecting portion for engaging with the first connecting portion to thereby connect the mounting head with the second housing.

7. A transducer according to claim 6, wherein the first connecting portion is circular in shape and includes an annular step that is formed on an inner surface of the first housing; and the second connecting portion is circular in shape and comprises a plurality of resilient hook-shaped tabs spaced circumferentially around the second housing for engaging the step to thereby snap-fit the second housing and the mounting head together.

8. A transducer according to claim 1, wherein the first housing includes a first connecting portion formed in the first hollow interior and the second housing includes a second connecting portion for engaging with the first connecting portion to thereby connect the mounting head with the second housing.

9. A transducer according to claim 8, wherein the first connecting portion is circular in shape and includes an annular step that is formed on an inner surface of the first housing; and the second connecting portion is circular in shape and comprises a plurality of resilient hook-shaped tabs spaced circumferentially around the second housing for engaging the step to thereby snap-fit the second housing and the mounting head together.

10. A transducer for determining the level of liquid within a container, the transducer comprising:
    a mounting head adapted for connection to the container, the mounting head having a first housing with first wall structure defining a first hollow interior;
    a second housing adapted to extend into the container, the second housing having second wall structure defining a second hollow interior that is isolated from liquid within the container, the second wall structure being open at an upper end thereof so that the second hollow interior is open and in fluid communication with the first hollow interior, with the first and second hollow interiors being sealed together such that the second hollow interior is isolated from liquid within the container;
    at least one sensor element located within the second hollow interior of the second housing;
    a float rod pivotally connected to the second housing at a location spaced from the second hollow interior;

a float connected to the float rod to thereby causing pivoting movement of the float rod in response to a change in liquid level within the container; and an actuator located outside of the housing and operatively associated with the float rod for pivotal movement therewith, the actuator being operative to change an electrical state of the at least one sensor element to thereby indicate a level condition of the liquid within the container.

11. A transducer according to claim 10, wherein the at least one sensor element comprises a plurality of reed switches and the actuator comprises a magnet that changes one of an open and closed electrical state of the reed switches during pivoting movement of the float rod.

12. A transducer according to claim 11, wherein the sensor assembly further comprises a sensor board located in the hollow interior, the sensor board having a shape that complements a shape of the hollow interior such that a substantial portion of the hollow interior is occupied by the sensor board, the reed switches being mounted on the sensor board in an arcuate pattern.

13. A transducer according to claim 12, wherein the reed switches are arranged in a radial pattern on the sensor board, a radial center of the arcuate pattern being coincident with the pivot mount.

14. A transducer for determining the level of liquid within a container, the transducer comprising:

a sensor assembly adapted to extend into the container, the sensor assembly including a first housing having a first wall structure defining a first hollow interior, at least one sensor located within the hollow interior, and a first connection portion comprising a plurality of tabs extending from the first wall structure and spaced around a circumference thereof; and a mounting head connected to the sensor assembly, the mounting head being configured for connection to the container, the mounting head including a second housing having a second wall structure defining a second hollow interior in communication with the first hollow interior, the second wall structure having a second connecting portion for receiving the first connection portion within the second hollow interior, the second connection portion including a plurality of connecting members associated with the second wall and corresponding to the plurality of tabs;

wherein the tabs and connecting members are mutually engageable in a snap-fit arrangement to thereby connect the sensor assembly to the mounting head.

15. A transducer according to claim 14, wherein:

each of the tabs includes one of a tab projection and tab aperture; and each of the connecting members comprises one of a connecting groove and a connecting projection to engage the one of the tab projection and tab aperture, respectively.

16. A transducer according to claim 1, wherein the second wall structure is generally rectangular in cross section to thereby form a correspondingly shaped second hollow interior.

17. A transducer according to claim 16, wherein the first housing includes a first connecting portion formed in the first hollow interior and the second housing includes a second connecting portion for engaging with the first connecting portion to thereby connect the mounting head with the second housing.

18. A transducer according to claim 17, wherein the first connecting portion is circular in shape and includes at least one step that is formed on an inner surface of the first housing; and the second connecting portion is circular in shape and comprises a plurality of resilient hook-shaped tabs spaced circumferentially around the second housing for engaging the at least one step to thereby snap-fit the second housing and the mounting head together.

19. A transducer according to claim 18, wherein the at least one step comprises an annular step for engaging the plurality of resilient hook-shaped tabs.

20. A transducer according to claim 1, wherein the sensor board extends along a height and a width of the second hollow interior.

* * * * *